(12) United States Patent
Ikemoto (10) Patent No.: US 8,817,168 B2
(45) Date of Patent: Aug. 26, 2014

(54) RANGING APPARATUS, RANGING METHOD AND IMAGING SYSTEM

(71) Applicant: Canon Kabushiki Kaisha, Tokyo (JP)

(72) Inventor: Kiyokatsu Ikemoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/859,998

(22) Filed: Apr. 10, 2013

(65) Prior Publication Data

US 2013/0278817 A1  Oct. 24, 2013

(30) Foreign Application Priority Data

Apr. 19, 2012 (JP) ................................ 2012-095648

(51) Int. Cl.
*H04N 5/232* (2006.01)
*G03B 13/00* (2006.01)

(52) U.S. Cl.
USPC ....................................................... 348/349

(58) Field of Classification Search
None
See application file for complete search history.

(56) References Cited

U.S. PATENT DOCUMENTS

| 2008/0259202 A1* | 10/2008 | Fujii | 348/345 |
| 2010/0157094 A1 | 6/2010 | Takamiya | |
| 2011/0085786 A1* | 4/2011 | Tamaki | 396/104 |
| 2012/0057043 A1 | 3/2012 | Yamamoto | |

FOREIGN PATENT DOCUMENTS

| JP | 2002-314062 A | 10/2002 |
| WO | 2012/018102 A1 | 2/2012 |

OTHER PUBLICATIONS

Mar. 27, 2014 extended European Search Report concerning European Patent Application No. 13164048.4.

* cited by examiner

*Primary Examiner* — Albert Cutler
(74) *Attorney, Agent, or Firm* — Fitzpatrick, Cella, Harper & Scinto (57) ABSTRACT

A ranging apparatus has an imaging unit including a pixel group for acquiring first and second images formed by luminous fluxes having passed through first and second pupil areas of an imaging optical system, and a calculation unit configured to create third and fourth images by performing convolution integrals on the first and second images with corrected first and second image modification functions, and to calculate a distance up to the subject by comparison of the third and fourth images, wherein the corrected first and second image modification functions are formed by causing centroid positions calculated based on data of sampling points of the first and second image modification functions corresponding to pixel arrangement of the pixel group to each coincide with a sampling point closest to the centroid position; and the convolution integral is performed by taking the sampling point closest to the centroid position as a reference point.

17 Claims, 7 Drawing Sheets

RANGING APPARATUS, RANGING METHOD AND IMAGING SYSTEM

BACKGROUND OF THE INVENTION

1. Field of the Invention

The present invention relates to a ranging apparatus, a ranging method and an imaging system, more particularly to a ranging apparatus and a ranging method which are used for an imaging system such as a digital still camera, a digital video camera, or the like.

2. Description of the Related Art

There are known distance detection techniques used for digital still cameras and video cameras. In Japanese Patent Application Laid-Open No. 2002-314062, a solid-state imaging device having a ranging function in a portion of pixels thereof, which is configured to detect a distance through a phase difference method, is proposed. This phase difference method includes processes of estimating a gap amount between optical images (respectively called as an A image and a B image, and also called as AB images collectively) produced by luminous fluxes having passed though different areas on a pupil of a camera lens and of calculating a defocus amount using triangulation with stereo images; ranging is thereby performed. According to this method, since any lens is not required to be moved for distance measurement, high-accurate and high-speed ranging is enabled unlike a conventional contrast method. Real-time ranging is also enabled when moving images are taken.

If vignetting in a luminous flux is caused by the frame of a taking lens or the like, the A and B images become different to each other, which causes the accuracy of estimating the image gap amount to be reduced and also the ranging accuracy to be degraded. An image-shape modification technique is disclosed in US 2012/0057043 A1. In this technique, image modification filters are formed using line spread functions corresponding to pupil areas for forming the A and B images. The shapes of the A and B images are modified by performing convolution integral on them with the image modification filters, respectively, after the filters have been mutually interchanged. Since the magnitude of the image modification filter (line spread function) varies depending on defocus amounts, the shape of the image modification filter is corrected in accordance with a calculated defocus amount, and the processes of modifying the images and recalculating the defocus amount are repeatedly performed. Desirable image modification filters are formed using a defocus amount close to the right value, which is acquired through such loop processing of the ranging calculation; thereby, the accuracy of image modification and distance measurement can be enhanced.

The AB images in the technique disclosed in US 2012/0057043 A1 are discrete data which are composed of the values acquired at respective pixels. In order to perform convolution integral on the respective images, the image modification filters are formed by discretizing the respective continuous line spread functions in accordance with arrangement spacing of pixels, taking the centroid positions of the respective continuous line spread functions as reference points. There is, however, a case in which the centroid position calculated from discrete values of the image modification filter differs from the reference point depending on the distance up to a subject (defocus amount). This error is called as a centroid error. If such a centroid error exists, the centroid position of a modified image deviates from that of the original image. The deviation causes an error to arise in estimated values of the image gap amount and the defocus amount. This centroid error is independent with respect to the shape error of the image modification filter, and even though loop processing of the ranging calculation is performed, either the centroid error or the shape error remains. The calculated values of the image gap amount and the defocus amount therefore do not converge, which causes the ranging time to increase and also causes the ranging accuracy to be degraded.

SUMMARY OF THE INVENTION

The present invention can provide a ranging apparatus, a ranging method and an imaging system that enable ranging with high accuracy at high speed.

A ranging apparatus according to the invention includes an imaging optical system for forming an image of a subject, an imaging unit including a pixel group for acquiring first and second images formed by luminous fluxes having passed mainly through first and second pupil areas, respectively, of an emitting pupil of the imaging optical system, and a calculation unit, wherein the calculation unit is configured to create a third image by performing convolution integral on the first image with a corrected first image modification function as well as to create a fourth image by performing convolution integral on the second image with a corrected second image modification function, and to calculate a distance up to the subject by comparison of the third and fourth images; the corrected first and second image modification functions are formed by causing respective centroid positions, which are calculated based on data of sampling points of respective first and second image modification functions corresponding to pixel arrangement of the pixel group, to each coincide with the sampling point closest to the centroid position; and the convolution integral is performed by taking the sampling point closest to the centroid position as a reference point.

A ranging method of the invention includes using an imaging optical system for forming an image of a subject; acquiring first and second images formed by luminous fluxes having passed mainly through first and second pupil areas, respectively, of an emitting pupil of the imaging optical system by use of an imaging unit having a pixel group; and measuring a distance up to the subject based on the first and second images acquired by the imaging unit. The ranging method has steps of forming first and second image modification filters; performing modification calculation by creating a third image by performing convolution integral on the first image with the first image modification filter, and also creating a fourth image by performing convolution integral on the second image with the second image modification filter; and calculating the distance up to the subject based on an image gap amount between the third and fourth images, wherein the step of forming the first and second image modification filters includes a process of performing discretization and centroid correction; and the image modification filters are each formed by discretizing an image modification function according to a pixel arrangement of the pixel group at the discretizing process to form a discrete function, and by causing the centroid position of the discrete function to coincide with a reference point, which is discrete data closest to the centroid position, at the process of performing centroid correction.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
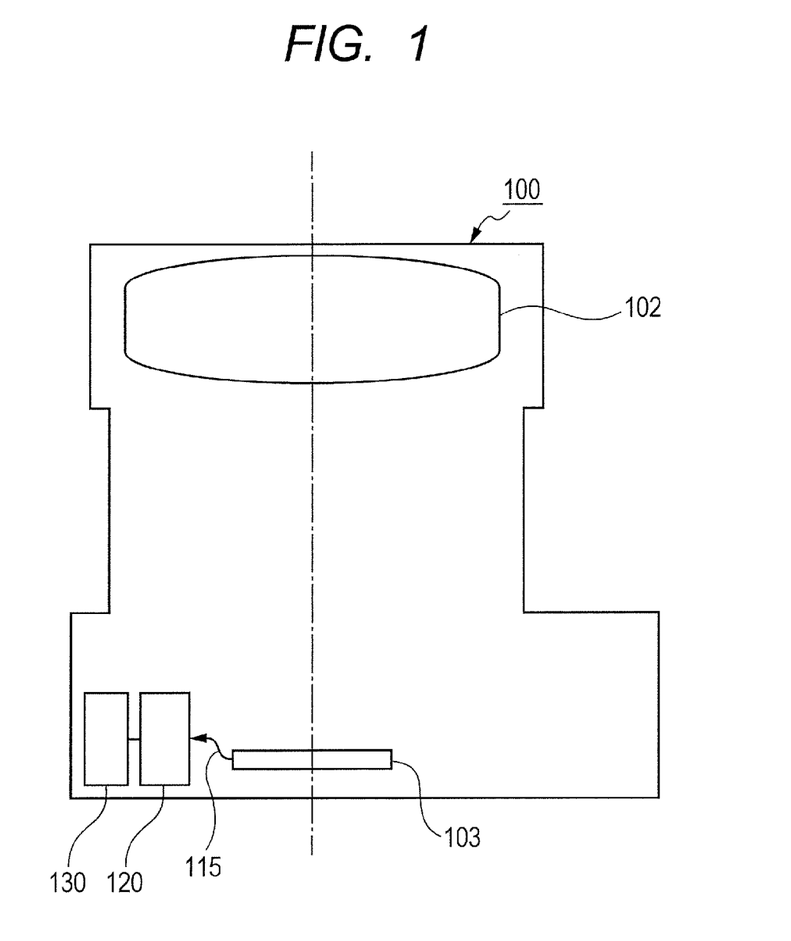
FIG. 1 is a schematic cross-sectional view of a configuration example of a ranging apparatus according to first embodiment of the present invention.

Configuration examples of a ranging apparatus and a ranging method embodying the present invention will be described below. A configuration example of the ranging apparatus 100 according to this embodiment is illustrated in FIG. 1. An imaging optical system 102 forms an image of an external subject on the surface of an imaging device 103. The imaging device 103 is structured of a plurality of pixels. The ranging apparatus 100 is provided with a wiring 115 for reading out acquired signals and a calculation unit 120 for calculating the distance up to the subject using acquired signals. The calculation unit 120 is constituted by, for example, a signal processing board including a CPU and a memory. The distance detecting device 100 is provided with a recording unit 130 for recording read-out signals or calculation results.

Figure 2:
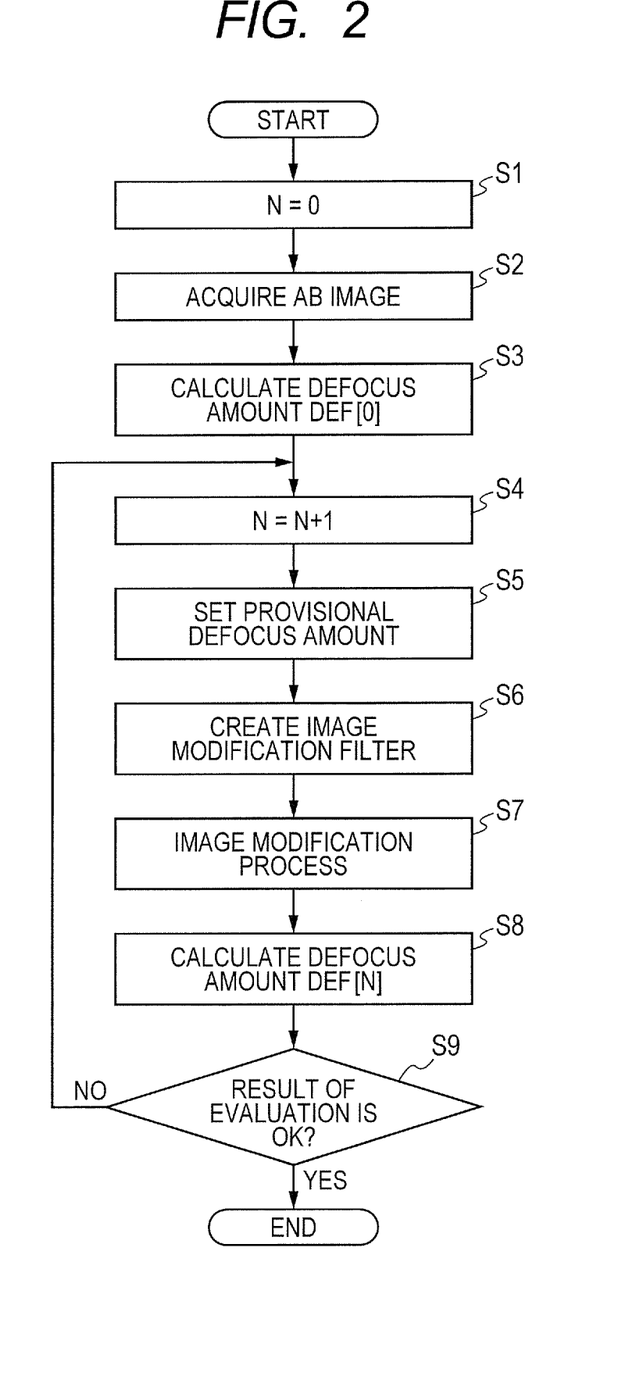
FIG. 2 is a flow chart explaining an example of the ranging method according to the first embodiment of the present invention.

The ranging method according to this embodiment will be explained along the flow chart shown in FIG. 2. At step S1, processing count N is set to 0. At step S2, AB images are acquired by means of the ranging apparatus 100 shown in the configuration example of FIGS. 3A, 3B. The imaging lens 102 in FIG. 3A forms an image of an external subject on the surface of the imaging device 103. The imaging device 103 is provided with a plurality of pixels 101 shown in FIG. 3B. The pixels 101 are each provided with, for example, a micro lens 107 and photoelectric conversion sections 105, 106 mounted in a board 104. The photoelectric conversion sections 105, 106 are disposed below shading members 108, 109, respectively. Although not shown in FIGS. 3A and 3B, the ranging apparatus 100 is provided with the wiring, the recording unit, CPU, and the like for reading out, recording and processing the acquired signals shown in FIG. 1.

Figure 3A:
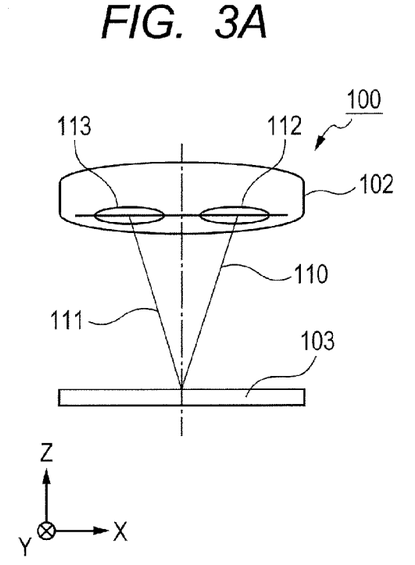
FIG. 3A is a schematic cross-sectional view explaining a configuration example of the ranging apparatus according to the first embodiment of the present invention.
Figure 3B:
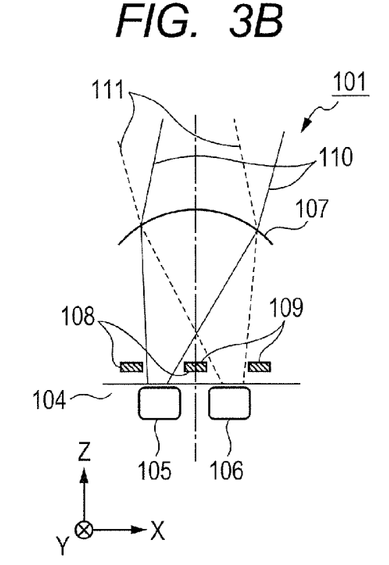
FIG. 3B is a schematic cross-sectional view explaining a configuration example of the ranging apparatus according to the first embodiment of the present invention.

The distance between the imaging lens 102 and the imaging device 103 is large with respect to the size of each of the pixels 101. Therefore, luminous fluxes having passed through different areas on the emitting pupil surface of the imaging lens 102 enter the surface of the imaging device 103 as luminous fluxes having different incident angles with each other. At the photoelectric conversion section 105 included in each pixel of the imaging device 103, a luminous flux is detected that has passed mainly through an area 112 (a first pupil area), which corresponds to a first direction 110, of the emitting pupil (emitting pupil of the optical system forming a subject image) of the imaging lens 102. Likewise, at the photoelectric conversion section 106, a luminous flux is detected that has passed mainly through an area 113 (a second pupil area), which corresponds to a second direction 111, of the emitting pupil of the imaging lens 102. An A image can be acquired based on pixel signals from the plurality of photoelectric conversion sections 105 and a B image can be acquired based on pixel signals from the plurality of photoelectric conversion sections 106. When the light quantity distribution of a subject is denoted as $f[x, y]$ and the point spread function composing the A image of the ranging optical system is denoted as $P_a[x, y]$, the light quantity distribution $A[x, y]$ of the A image can be expressed in a relation of convolution integral as with

EQUATION 1

$$A[x, y] = \sum_{-\infty}^{+\infty} \sum_{-\infty}^{+\infty} f[x-p, y-q]P_a[p, q] \quad \text{EQUATION 1}$$

In detection of the distance up to a subject, attention is directed to the one-dimensional direction of the pair of subject images and the image gap amount is calculated. In this embodiment, this direction is rendered to be the direction of x-axis. Then, the light quantity distribution $A[x]$ in the one-dimensional direction of the A image can be expressed as with EQUATION 2 by use of a line spread function $L_a[x]$ instead of the point spread function. The line spread function $L_a[x, y]$ is determined based on the incident angle property of the photoelectric conversion section 105, which detects a luminous flux having passed mainly through the first pupil area, in the pixel 101, and the emitting pupil of the imaging lens 102.

$$A[x] = \sum_{-\infty}^{+\infty} f[x-p]L_a[p] \quad \text{EQUATION 2}$$

The light quantity distribution $B[x]$ in the one-dimensional direction of the B image can also be expressed as with EQUATION 3 by use of a line spread function $L_b[x]$.

$$B[x] = \sum_{-\infty}^{+\infty} f[x-p]L_b[p] \quad \text{EQUATION 3}$$

If vignetting is caused by the frame of an taking lens, or the like, line spread functions La[x] and Lb[x] forming the A and B images, respectively, become different functions, which causes the A and B images to have different shapes with each other. At step S3, the distance up to a subject is calculated from the pair of A and B images by means of a known distance calculating unit. For example, the image gap amount between the A and B images is acquired by correlation calculation for the pair of AB images, and the base line length is acquired from the centroid distance between the pair of AB images. A defocus amount DEF[0] is acquired based on the image gap amount and the base line length acquired in this manner, and then the distance up to the subject can be calculated.

At step S4, 1 is added to the processing count N and the process is then continued to step S5. At step S5, a provisional defocus amount used in the following processes is set. In the case when the processing count N is 1, the defocus amount DEF[0] calculated at step S3 is set, while in the case when the processing count N is 2 or more, an updated defocus amount DEF[N] calculated at step S8 (described later) is set as a provisional defocus amount.

At step S6 and step S7, an A' image (third image) and a B' image (fourth image) are formed (created) by modifying the A and B images, respectively. Step S6 is a step in which an image modification filter La'[x] (the second image modification filter) and the other image modification filter Lb'[x] (the first image modification filter) are formed, and includes a process of discretization and a process of centroid correction. The image modification filters are formed based on the image modification functions (the first and second modification functions). The image modification functions are rendered to be, for example, line spread functions (line image functions) corresponding to the A and B images, respectively.

Figure 4:
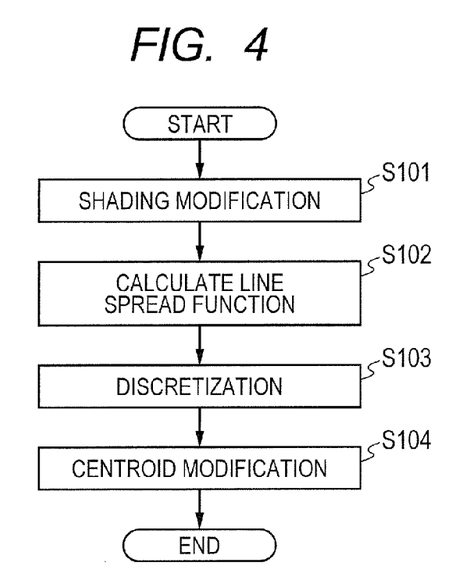
FIG. 4 is a flow chart of a process for forming an image modification filter according to a first embodiment of the present invention.

FIG. 4 is a flow chart for forming an image modification filter. FIGS. 5A to 5D show functions formed at the respective steps.

Figure 5A:
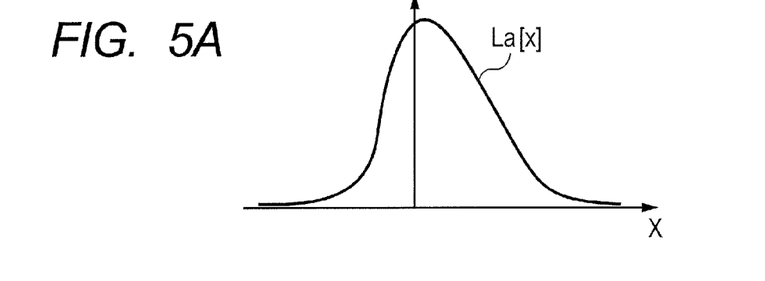
FIG. 5A illustrates an image modification function according to the first embodiment of the present invention.
Figure 5B:
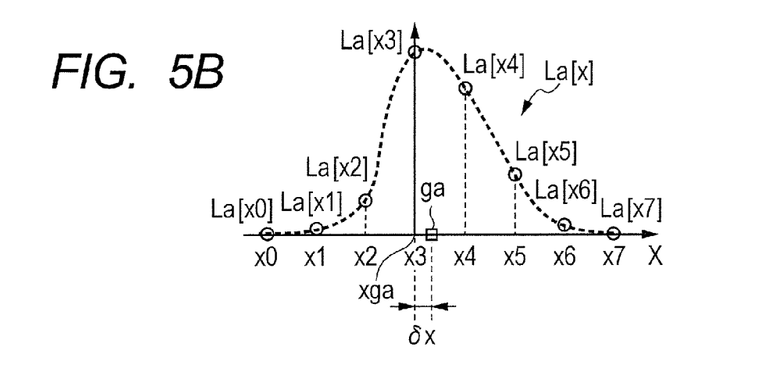
FIG. 5B illustrates a discrete function according to the first embodiment of the present invention.

At step S101, shading of the AB images is estimated based on lens information, position information on the imaging surfaces of the ranging pixels having picked up the AB images, and the provisional defocus amount, and then shading correction for adjusting the light quantity ratio of the AB images is performed. At step S102, image modification functions are calculated. For example, pupil intensity distribution stored in the recording unit is read out, and the line spread function La[x] is calculated based on the lens information, the position information on the imaging surfaces of the ranging pixels, and the provisional defocus amount set at step S5 (FIG. 5A). At this time, an adjustment is performed as necessary so that the maximum values of La[x] and Lb[x] become identical. This is because the shading correction for the AB images has been performed at step S101. At step S103, a discrete function La[x] is formed by discretizing the image modification function (FIG. 5B). This discretization is conducted in accordance with the arrangement spacing of the ranging pixels 101 for a calculation made with the acquired B image.

The centroid position ga on the x axis of the discrete function La[x] is calculated by EQUATION 4. i denotes a positive integer, and n denotes the number of ranging pixels which are used for ranging calculation.

$$g_a = \frac{\sum_{i=1}^{n} x_i L_a[i]}{\sum_{i=1}^{n} L_a[i]} \quad \text{EQUATION 4}$$

Figure 5C:
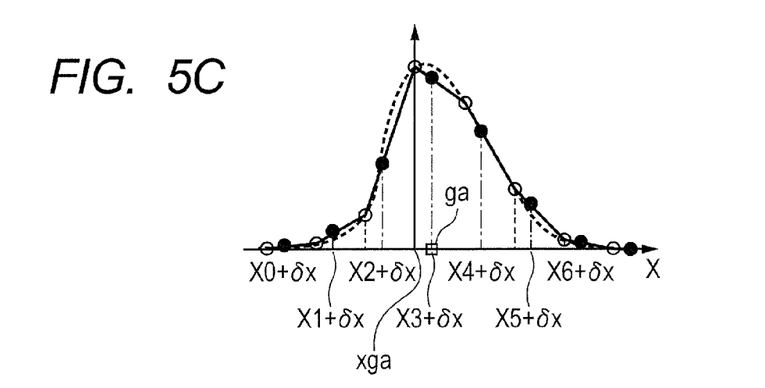
FIG. 5C illustrates a discrete function according to the first embodiment of the present invention.
Figure 5D:
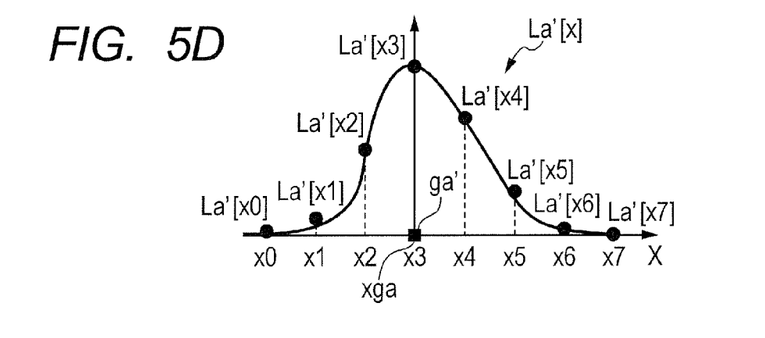
FIG. 5D illustrates the image modification filter according to the first embodiment of the present invention.

Among the discrete data of the discrete function La[x], the position of the discrete data closest to the centroid position ga on the x axis is denoted as a reference point xga, and the difference between the reference point xga and the centroid position ga is denoted as δx. At step S104, the centroid position of the discrete function La[x] is corrected. Intermediate points between respective data (between sampling points) of the discrete function La[x] are interpolated using a one-dimensional function, and the interpolated value at the position shifted (moved) by δx in the x axis direction from each of positions of the respective data is calculated (FIG. 5C). Based on the calculated interpolated values, the image modification filter La'[x] (the second image modification filter) is formed (FIG. 5D). At this time, an adjustment is performed as necessary so that the maximum values of La'[x] and Lb'[x] become identical. The centroid position calculated based on the respective data of the image modification filter La'[x] is denoted as the centroid position ga'. By use of a technique like this, the image modification filter La'[x], which has a shape approximately identical with the discrete function La[x] and in which the centroid position ga' and the reference point xga coincide with each other, can be formed. As to the image modification filter Lb'[x], the image modification filter Lb'[x] (the first image modification filter), which has a shape approximately identical with the discrete function Lb[x] and in which the centroid position gb' and the reference point xgb coincide with each other, also can be formed in a similar procedure.

At step S7, an A' image and a B' image having modified image shapes are formed using the A and B images and the image modification filters La' and Lb'. By performing convolution integral on a one-dimensional signal A[x] of the A image with the image modification filter Lb'[x], A'[x] is formed. At this time, the reference point of convolution integral is denoted as the reference point xgb. The A' image is expressed by EQUATION 5.

$$A'[x] = \sum_{i=1}^{n} A[x-i]L'_b[i] = \sum_{j=1}^{n}\sum_{i=1}^{n} f[x-j-i]L_a[j]L'_b[i] \quad \text{EQUATION 5}$$

Likewise, as to the image B, by performing convolution integral on a one-dimensional signal B[x] of the B image with the image modification filter La'[x], B'[x] is formed. At this time, the reference point of the convolution integral is denoted as the reference point xga. The B' image is expressed by EQUATION 6.

$$B'[x] = \sum B[x-i]L'_a[i] = \sum_{j=1}^{n}\sum_{i=1}^{n} f[x-j-i]L'_a[j]L_b[i] \quad \text{EQUATION 6}$$

Since La'[x] and La[x] are functions each having an approximately identical shape, and Lb'[x] and Lb[x] are also the same as above, the A' and B' images acquired based on EQUATIONS 5 and 6 are each rendered to have approximately the same shape as the original light quantity distribution f of the subject. At step S8, the defocus amount DEF[N] and the distance up to the subject are calculated using the A' and B' images through a known method as with step S3. The use of the modified A' and B' images causes calculation errors of the image gap amount due to the shape difference between the both images to be decreased and also causes calculation accuracy of the defocus amount to be enhanced. In addition, the use of the image modification filters according to the present invention enables to calculate a defocus amount and the distance up to a subject with a higher degree of accuracy than conventional technique.

At step S9, determination on whether or not to repeat the modification calculation is given. More specifically, the difference between the defocus amount DEF[N] acquired at step S8 and the provisional defocus amount set at step S5 is calculated, and is compared with a predetermined threshold value for convergence determination. When the difference is larger than the threshold value, since the calculated defocus amount does not converge, the process returns to step S4. At step S4, this defocus amount DEF[N] is set as a provisional defocus amount, and re-processing is performed. When the difference has converged to the threshold value or less at step S9, the flow is completed. The shape of each of the line spread functions La[x] and Lb[x] varies depending on the defocus amount. By repeating loop processing like this to form an image modification filter based on the defocus amount DEF [N] close to the right value, the shape error of the image modification filter becomes small. Therefore, the shape error of the modified image is reduced, the accuracy of calculating the image gap amount and the defocus amount is enhanced, and the ranging accuracy is also enhanced.

By performing ranging using the image modification filters according to this embodiment along the above flow chart, a defocus amount can be calculated with high accuracy at high speed as compared with a conventional technique. The defocus amount (distance) is calculated based on an image gap amount of a pair of images each modified using image modification filters. This image gap amount can be acquired by performing a correlation calculation as one of a pair of modified images is shifted, and by calculating the gap amount when the correlation has become highest. The image gap amount calculated at this time is determined based on centroid positions and image shapes of the respective images. If the image modification filter has a centroid error, the centroid position of the modified image changes from the centroid position of the image at the time before modified. If the shape of the image modification filter is different from the shape of the discrete function of the image modification function corresponding to the right defocus amount, the modified images are caused to have different shapes to each other. These errors bring about an error in a calculated value of the image gap amount, which causes the ranging accuracy to be degraded.

In this embodiment, the centroid error is reduced by correcting respective data values of the discrete function to form an image modification filter having the centroid position and the reference point having caused to coincide with each other. In addition, the shape error is controlled by causing intermediate points between discrete data to undergo function interpolation to form an image modification filter based on the interpolated values. Due to these effects, an image modification filter having the small centroid error and the small shape error can be acquired, and a highly accurate ranging can be implemented. By using the image modification filter according to this embodiment, convergence in the calculation for ranging through loop processing is enhanced, and ranging can be performed with high accuracy at high speed. The image modification filter according to this embodiment has a function shape to which the centroid error is reflected. Due to repetition of the calculation for ranging through loop processing, the result converges to a defocus amount that causes the centroid error and the shape error to minimize. The image modification filter according to this embodiment therefore enables to calculate a proper defocus amount at a less loop count as compared to a conventional image modification filter and enables ranging to be performed with high accuracy at high speed.

The reasons why the image modification filter according to this embodiment can be formed easily at high speed will be described. The number of data of the discrete function used for calculation for ranging is denoted as n, and a number of discrete data is denoted as i. The value of each of data is denoted as Li, and each value of the discrete data is assigned to be L1 to Ln, while L0, Ln+1 and Ln+2 are each rendered to be 0. Here, the coordinate of discrete data on the imaging surface is denoted as xi, and the interval is denoted as $\Delta x$. The centroid position g before centroid correction is executed can be calculated from EQUATION 7.

$$g = \frac{\sum_{i=0}^{n} x_i L_i dx}{\sum_{i=0}^{n} L_i dx} \quad \text{EQUATION 7}$$

The amount of gap between the centroid position g and the reference point is denoted as $\delta x$. Intermediate points between discrete data are interpolated with a one-dimensional function, and the interpolated value at the position shifted by $\delta x$ from each of the discrete data is denoted as Li'. This Li' is expressed by EQUATION 8, and the centroid position g' is expressed by EQUATION 9.

$$L'_i = L_i - \delta x \frac{L_i - L_{i+1}}{\Delta x} \quad \text{EQUATION 8}$$

$$\begin{aligned} g' &= \frac{\sum_{i=0}^{n}(x_i L'_i)}{\sum_{i=0}^{n} L'_i} \\ &= \frac{\sum_{i=0}^{n}\left[x_i\left(L_i - \delta x \frac{(L_i - L_{i+1})}{\Delta x}\right)\right]}{\sum_{i=0}^{n}\left[L_i - \delta x \frac{(L_i - L_{i+1})}{\Delta x}\right]} \\ &= \frac{\sum_{i=0}^{n}(x_i L_i) - \frac{\delta x}{\Delta x}\sum_{i=0}^{n}(\Delta x L_i) + \frac{\delta x}{\Delta x}(-x_1 L_1 + x_n L_{n+1})}{\sum_{i=0}^{n} L_i - \frac{\delta x}{\Delta x}(L_1 - L_{n+1})} \\ &= \frac{\sum_{i=0}^{n}(x_i L_i)}{\sum_{i=0}^{n} L_i} + \frac{\frac{\delta x}{\Delta x}\sum_{i=0}^{n}(\Delta x L_i)}{\sum_{i=0}^{n} L_i} \\ &= g - \delta x \end{aligned} \quad \text{EQUATION 9}$$

As known from EQUATION 9, the centroid position g' is rendered to be one which is shifted by $-\delta x$ from the original centroid position g expressed by Equation 7, and comes to coincide with the reference point. As described above, an image modification filter can be easily formed at high speed according to the technique of this embodiment.

Figure 6:
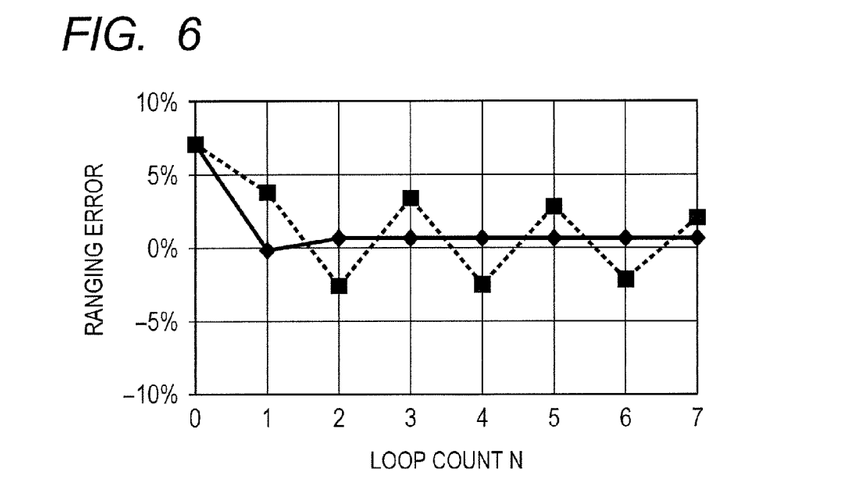
FIG. 6 is a graph explaining as to the results of measuring the distance up to a subject when image modification filters according to the first embodiment of the present invention have been used.

FIG. 6 illustrates the ranging accuracy when modification calculation is performed using image modification filters according to the present invention. The lateral axis in the graph denotes processing count N in the flow chart of FIG. 2. The vertical axis denotes the error of calculated defocus amounts, which are the value obtained by dividing the difference between the right value of a defocus amount and a calculated value with the right value. The solid line represents the results when image modification filters according to the present invention are used, while the broken line represents the results when conventional image modification filters La, Lb are used. As shown in the graph, the error does not decrease even with increase of processing count N when the conventional image modification filters are used. On the other hand, it is known that, when the image modification filters according to the invention are used, ranging errors are decreased at less processing count N and highly accurate high-speed ranging is enabled.

Since the A image and the B image are determined based on the point spread functions as represented by EQUATION 1, the image modification filters may be formed based on the point spread functions instead of the line spread functions to modify the shapes of the images. In this case, the processes at step 6 and step 7 are performed two-dimensionally, so that the effects similar to the above mentioned effects can be exerted.

Figure 7A:
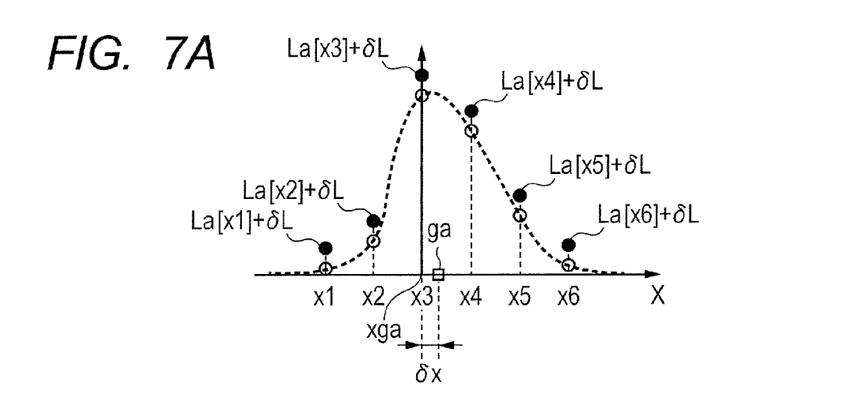
FIG. 7A illustrates another discrete function according to another embodiment of the present invention.
Figure 7B:
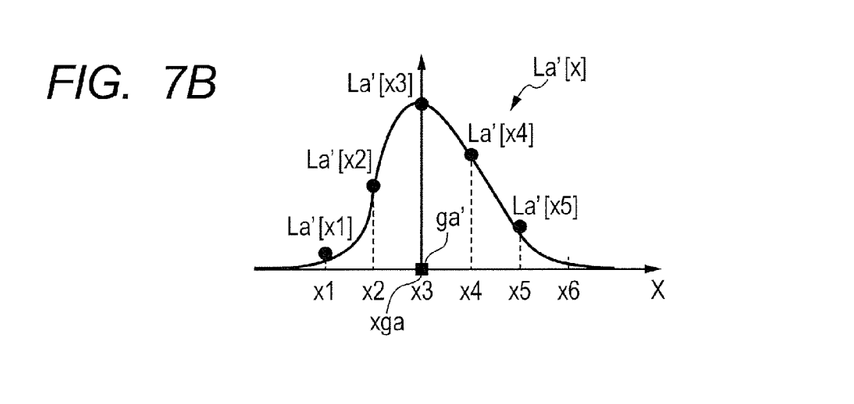
FIG. 7B illustrates another image modification filter according to another embodiment of the present invention.

The process of forming an image modification filter at step S6 in this embodiment may be implemented using a different method. For example, at step S104, centroid correction may be implemented by adding a predetermined value to the respective discrete data of a discrete function. FIGS. 7A and 7B illustrate the function formed in accordance with this method at step S104. A predetermined value $\delta L$ is added to the respective discrete data of a discrete function La[x] (FIG. 7A). The centroid position before it has been corrected is denoted as g, the centroid position after having been corrected is denoted as g', and the gap amount between the centroid position g and the position of one of discrete data closest thereto is denoted as $\delta x$. The centroid position g' after having been corrected can be expressed by EQUATION 10.

$$g' = g + \delta x \qquad \text{EQUATION 10}$$

The centroid position g' when the predetermined value $\delta L$ has been added to the respective discrete data can be expressed by EQUATION 11. In the EQUATION 11, i denotes a number of discrete data, n denotes the number of data, xi denotes the coordinate of the respective data, and Li denotes the respective data values.

$$g' = \frac{\sum_{i=1}^{n} [x_i(L_i + \delta L)]}{\sum_{i=1}^{n} (L_i + \delta L)} \qquad \text{EQUATION 11}$$

$$= \frac{\sum_{i=1}^{n} (x_i L_i) + \delta L \sum_{i=1}^{n} (x_i)}{\sum_{i=1}^{n} (L_i) + n\delta L}$$

Based on the above Equations 10 and 11, the predetermined value $\delta L$ can be expressed by Equation 12.

$$\delta L = \frac{\sum_{i=1}^{n} (x_i L_i) - (g + \delta x) \sum_{i=1}^{n} (L_i)}{(g + \delta x)n - \sum_{i=1}^{n} (x_i)} \qquad \text{EQUATION 12}$$

Next, an adjustment is performed as necessary so that the maximum values of both the image modification filters La'[x] and Lb'[x] are equalized, and the image modification filter La'[x] is formed (FIG. 7B). An image modification filter having an approximately identical shape with respect to the original discrete function can be formed by the technique like this. Then, by calculating the value $\delta L$ expressed by Equation 12 to add it to the respective discrete data, an image modification filter can be formed at single processing in which the centroid position and the position of the discrete data are in coincident with each other. An image modification filter having reduced the shape error and the centroid error can be easily acquired, and a highly accurate ranging can be implemented at high speed.

In image modification processes at steps S6 and S7 in this embodiment, the inverse function of a line spread function may be used as the image modification function. The one-dimensional signal of the A image is denoted as A[x] and the image modification filter formed using the inverse function of the line spread function corresponding to the A image (first image) is denoted as La'-1[x]. By performing a similar process as with step S6, the image modification filter La'-1[x] (the first image modification filter), in which the centroid position and the reference point are in coincident with each other, can be formed. The image shape is modified by performing convolution integral on a one-dimensional signal A[x] of the A image with the image modification filter La'-1[x]. At this time, the reference point of the convolution integral is rendered to be the reference point xga of the image modification filter La'-1[x]. The A' image, the shape of which is modified from that of the A image, is expressed by EQUATION 13.

$$A'[x] = \sum_{i=1}^{n} A[x-i] L_a'^{-1}[i] \qquad \text{EQUATION 13}$$

$$= \sum_{j=1}^{n} \sum_{i=1}^{n} f[x-j-i] L_a[j] L_a'^{-1}[i]$$

Likewise, as to the B image, the image shape is modified by performing convolution integral on a one-dimensional signal B[x] of the B image with the image modification filter Lb'-1[x] (the second image modification filter), which has been formed using the inverse function of the line spread function corresponding to the B image (the second image). The B'[x], the shape of which is modified from that of the B image, is expressed by EQUATION 14. At this time, the reference point of the convolution integral is rendered to be the reference point xgb of the image modification filter Lb'-1[x].

$$B'[x] = \sum_{i=1}^{n} B[x-i] L_b'^{-1}[i] \qquad \text{EQUATION 14}$$

$$= \sum_{j=1}^{n} \sum_{i=1}^{n} f[x-j-i] L_b[j] L_b'^{-1}[i]$$

Since La'[x] and La[x] are functions each having an approximately identical shape, and Lb'[x] and Lb[x] are also the same as above, the A' and B' images acquired based on Equations 13 and 14 are each rendered to have approximately the same shape as the original light quantity distribution f of the subject. A blur of an image of the subject due to defocus can be eliminated and the distinct A' and B' images can be acquired by implementing the process like this. The defocus amount DEF[N] and the distance up to the subject are calculated using the A' and B' images through a known method and, thereby, a highly accurate ranging can be implemented. Incidentally, in this embodiment, although the method is presented by which the determination whether or not to perform the calculation again at step S9 is made based on the convergence state of the defocus amount (distance information on the subject), a different method may be employed. The determination may also be made based on the convergence state of, for example, the shape of the image modification filter, the base line length, the image gap amount between the AB images, or the like. The determination may further be made by counting the number of processing times with respect to a predetermined number N having set in advance.

Figure 8:
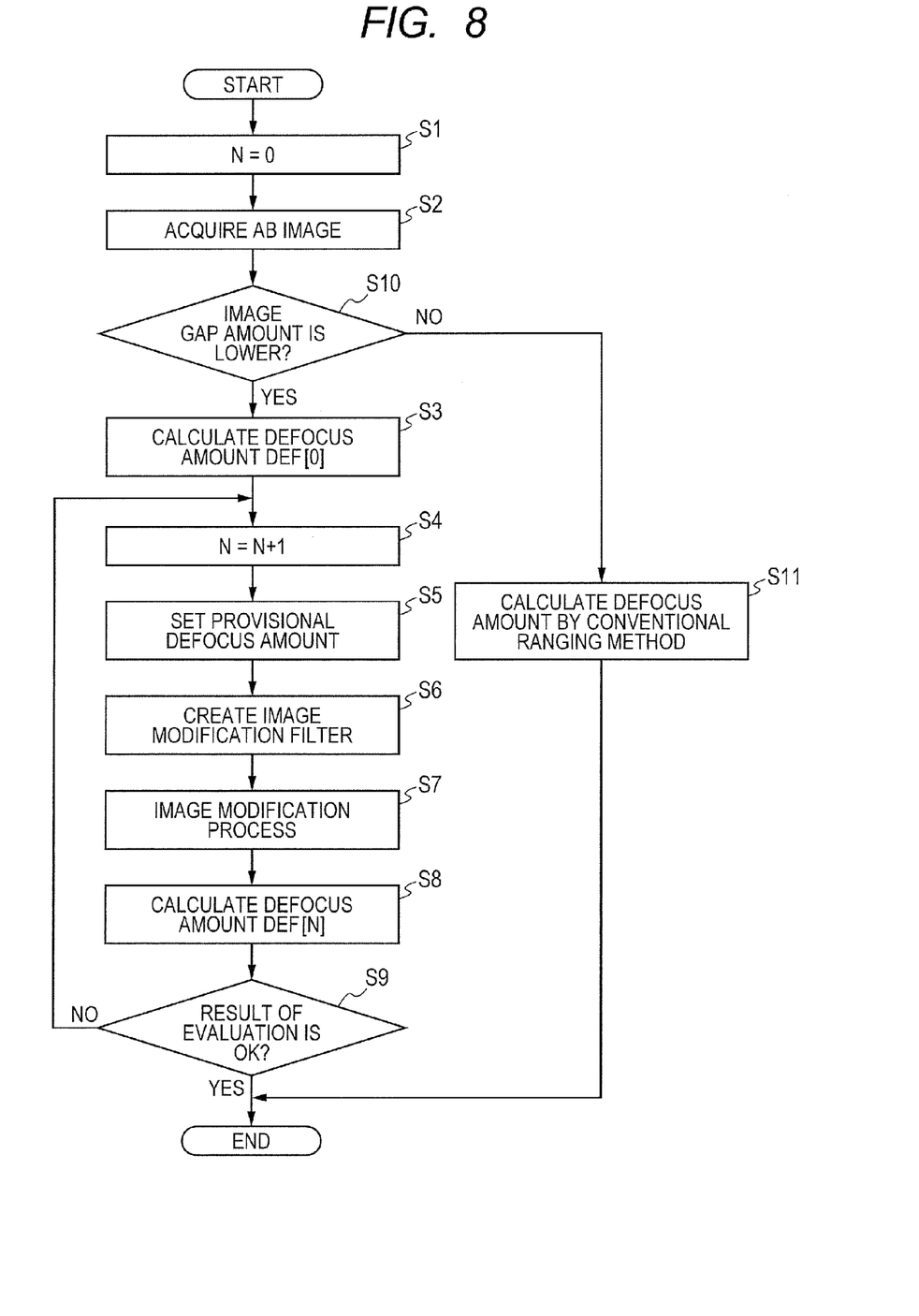
FIG. 8 is a flow chart explaining an example of the ranging method according to another embodiment of the present invention.

In this embodiment, a process for estimating the magnitude of the image gap amount between the first and second images may be provided, and ranging may be performed using image modification filters according to the present invention when the image gap amount is small. FIG. 8 is a flow chart in this case. The image gap amount between the AB images decreases as the defocus amount becomes small. On the other hand, a centroid error amount and the error amount of image gap resulting therefrom are not proportional to the defocus amount. For this reason, the smaller the defocus amount, the larger the influence of the error in the image gap amount resulting from a centroid error becomes, and ranging accuracy becomes worse. Further, convergence in a loop process also becomes worse and the ranging time increases. As shown in FIG. 8, step S10 for estimating the magnitude of the image gap amount between the AB images is therefore provided. When the image gap amount is small, the process is advanced to step S3 onward, and ranging is performed using the image modification filters according to the present invention. When the image gap amount is large, since the influence of the centroid error is small, the process is advanced to step S11, and ranging is performed using a conventional method. For example, ranging is performed using conventional image modification filters each having a centroid error, or ranging may be performed using acquired AB images without executing the process of image modification. At step S10, the criterion of estimating the magnitude of an image gap amount can be determined by comparing the error in the image gap amount resulting from a centroid error with the tolerance of the image gap amount. The tolerance of the image gap amount is determined based on an aimed ranging accuracy and the configuration of the ranging apparatus. By performing the process along a flow chart like this, an appropriate ranging can be performed depending on an approximate distance up to a subject (defocus amount), and a highly accurate ranging can be implemented at a higher speed.

The results of ranging by use of the ranging apparatus 100 according to this embodiment can be used for, for example, focus detection of imaging optical systems. A ranging apparatus 100 according to this embodiment enables to measure the distance up to a subject with high accuracy at high speed, and the gap amount between the subject and the focal position of an imaging optical system can be known. By controlling the focal position of an imaging optical system, the subject can be focused with high accuracy at high speed.

As with pixels 101 in the ranging apparatus 100 according to this embodiment, by arranging plural photoelectric conversion sections in a single pixel, image signals of the pixels 101 can be created using the signals acquired by the photoelectric conversion sections 105 and 106. If pixels like these are arranged in all the pixels in the imaging device 103, image signals can be acquired at each of the pixels, and an image of the subject can be acquired together with performing ranging. Moreover, by performing ranging using pixel signals extracted from an arbitrary group of pixels in the imaging device 103, the distance up to an arbitrary imaging area (subject) can be measured. By extracting pixel signals from respective areas in the imaging device 103 and by performing ranging using them, a range image can also be acquired.

The ranging apparatus 100 according to the present invention is not limited to the structure of this embodiment. It may be allowed to dispose the pixels 101 in a portion of the imaging device (solid-state imaging device) 103, which is configured by arranging pixels in a plane, and to dispose pixels for acquiring an image in the other portion thereof. Ranging is therefore performed using the partial pixels 101, while acquisition of an image of the subject can be performed using the remaining pixels. The imaging device 103 can be configured so that pixels are disposed in one direction on the imaging surface and ranging is performed by detecting the image gap amount in the one direction. The shading members 108, 109 and the photoelectric conversion sections 105, 106 disposed in the respective pixels 101 may be arranged in y direction, and ranging may be performed using signals acquired by the respective photoelectric conversion sections. With the structure like this, ranging of a subject having a variation of contrast in the y direction can be performed. Another structure may also be possible in which pixels each having the shading members 108, 109 and the photoelectric conversion sections 105, 106 arranged in x direction and also in y direction are mixed, or in which the pixels are arranged in a diagonal direction (xy direction). Ranging can be performed with appropriately choosing signals used for ranging depending on the direction in which the contrast of the subject varies.

Figure 9A:
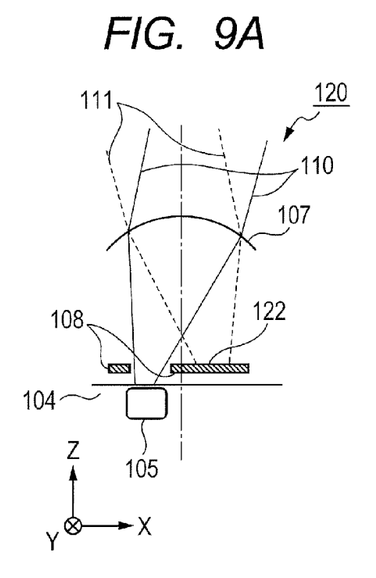
FIG. 9A is a schematic cross-sectional view explaining a configuration example of the ranging apparatus according to another embodiment of the present invention.
Figure 9B:
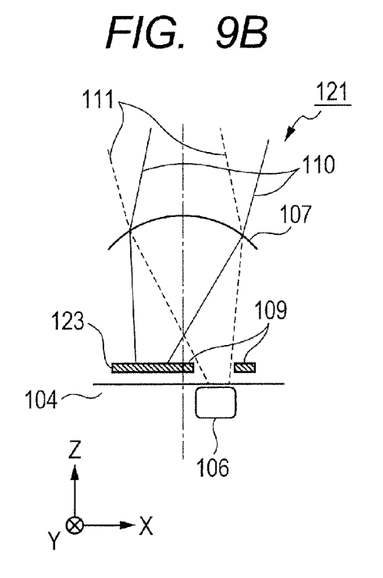
FIG. 9B is a schematic cross-sectional view explaining a configuration example of the ranging apparatus according to another embodiment of the present invention.

A structure may also be possible in which plural pairs of pixels 120 and 121 illustrated in FIGS. 9A and 9B are arranged. The pixel 120 is provided with a micro lens 107 and a shading member 122 on a board 104 and an photoelectric conversion section 105 mounted in the board 104, and the pixel 121 is provided with a micro lens 107 and a shading member 123 on the board 104 and an photoelectric conversion section 106 mounted in another board 104. The pixel 120 is able to receive light incident from a first direction, while the pixel 121 is able to receive light incident from a second direction. AB images can be acquired based on signals acquired by the photoelectric conversion sections 105, 106 in the pixels 120, 121, respectively. Since the spacings between the shading members and between the photoelectric conversion sections become large, respective pixels can be easily fabricated.

Figure 10:
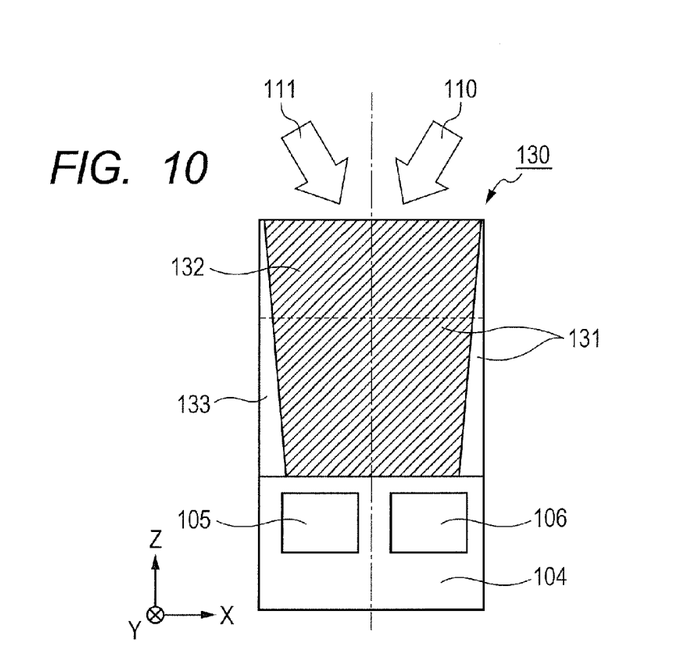
FIG. 10 is a schematic cross-sectional view explaining a configuration example of the ranging apparatus according to another embodiment of the present invention.

Further, each of pixels included in a ranging apparatus 100 may be structured using a waveguide illustrated in FIG. 10. A pixel 130 has a waveguide 131 arranged on the light-entering side (+z side) of a board 104 and photoelectric conversion sections 105, 106 disposed in the board 104. The waveguide 131 includes a core portion 132 and a clad portion 133. The core portion 1322 and the clad portion 133 are formed of a material being transmissive in the imaging wavelength band, and the core portion 132 is formed of a material having a higher refractive index as compared with that of the clad portion 133. Therefore, light can be confined within the core portion 132 and the clad portion 133 and light can be allowed to propagate therethrough. A luminous flux having entered the pixel 130 from the outside propagates through the waveguide 131 and is emitted into the board 104. The luminous flux 110 having entered the pixel 130 from the first direction propagates through the waveguide 131 and is able to be introduced to the photoelectric conversion section 105. On the other hand, the luminous flux 111 having entered the pixel 130 from the second direction propagates through the waveguide 131 and is able to be introduced to the photoelectric conversion section 106. By configuring the device in this manner, light depending on the incident direction thereof can be effectively detected.

The structure of a backside incident type may also be possible in which a waveguide constituted by a core portion and a clad portion is provided in a board 104. By configuring the device in this manner, light entering from the backside of the board (light propagating in +z direction) can be detected. Wiring and the like can be arranged on the front side of the board 104, by which the propagation of incident light is prevented from being interfered by the wiring and the like. In addition, space-wise restriction due to the wiring and the like is lessened, and the incident light can therefore be effectively introduced to photoelectric conversion sections. The ranging apparatuses and the ranging methods according to the above embodiments are able to be favorably applied to an imaging optical system such as a digital still camera, a digital video camera, or the like.

According to the present invention, a ranging apparatus, a ranging method and an imaging system which enable to perform highly accurate high-speed ranging can be actualized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-095648 filed on Apr. 19, 2012, which is hereby incorporated by reference herein in its entirety.

What is claimed is:

1. A ranging apparatus comprising:
an imaging optical system arranged to form an image of a subject;
an imaging unit including a pixel group arranged to acquire a first image and a second image, the first and second images being formed by luminous fluxes having passed mainly through a first pupil area and a second pupil area, respectively, of an emitting pupil of the imaging optical system; and
a calculation unit,
wherein the calculation unit is configured to create a third image by performing convolution integral on the first image with a corrected first image modification function as well as to create a fourth image by performing convolution integral on the second image with a corrected second image modification function, and to calculate a distance up to the subject by comparison of the third and fourth images,
wherein the corrected first and second image modification functions are formed by causing respective centroid positions, which are calculated based on data of sampling points of respective first and second image modification functions, to each coincide with the sampling point closest to the centroid position, the sampling points being corresponding to pixel arrangement of the pixel group, and wherein the convolution integral is performed by taking the sampling point closest to the centroid position as a reference point.

2. The ranging apparatus according to claim 1, wherein the corrected first and second image modification functions are acquired by interpolating between data of the sampling points of the respective first and second image modification functions with a one-dimensional function, and by using the values interpolated with one-dimensional function at the positions shifted from the respective sampling points by a difference between the centroid position and the reference point.

3. The ranging apparatus according to claim 1, wherein the corrected first and second image modification functions are acquired by adding predetermined values expressed with a following equation to data of the sampling points of the respective first and second image modification functions:

$$\delta L = \frac{\sum_{i=1}^{n}(x_i L_i) - (g + \delta x)\sum_{i=1}^{n}(L_i)}{(g + \delta x)n - \sum_{i=1}^{n}(x_i)}$$

where,
δL: Predetermined value
i: A number corresponding to sampling points of image modification function
n: The number of sampling points used for ranging
xi: Coordinate of sampling points
Li: Data of sampling points of image modification function
g: Centroid position calculated based on data of sampling points of image modification function
δx: Gap amount between centroid position g and reference point.

4. The ranging apparatus according to claim 1, wherein the calculation unit is configured to calculate a distance up to the subject by comparison of the first and second images, and to form the corrected first and second image modification functions based on the calculated distance information.

5. The ranging apparatus according to claim 1, wherein the first image modification function is a line spread function corresponding to the second image, and the second image modification function is a line spread function corresponding to the first image.

6. The ranging apparatus according to claim 1, wherein the first image modification function is an inverse function of the line spread function corresponding to the first image, and
the second image modification function is an inverse function of the line spread function corresponding to the second image.

7. The ranging apparatus according to claim 1, wherein the pixel group includes a partial pixel group of a solid-state imaging device configured by arranging pixels in a plane.

8. An imaging system arranged to perform focus detection of the imaging optical system based on ranging results of the ranging apparatus according to claim 1.

9. An imaging system comprising the ranging apparatus according to claim 1, the imaging system arranged to acquire a distance image.

10. A ranging method of measuring a distance up to a subject utilizing an imaging optical system arranged to form an image of the subject to acquire a first image and a second image using an imaging unit including a pixel group, the first and second images being formed by luminous fluxes having passed mainly through a first pupil area and a second pupil area, respectively, of an emitting pupil of the imaging optical system, the distance up to the subject being measured based on the first and second images acquired by the imaging unit, the method comprising:

forming a first and second image modification filters;

creating a third image by performing convolution integral on the first image with the first image modification filter, and also creating a fourth image by performing convolution integral on the second image with the second image modification filter; and calculating a distance up to the subject based on an image gap amount between the third and fourth images, wherein the forming first and second image modification filters includes discretizing and correcting, and wherein the image modification filters are each formed through discretizing an image modification function according to a pixel arrangement of the pixel group to form a discrete function, and, correcting a centroid by taking a position of the discrete data closest to a centroid position of the discrete function from among a discrete data of the discrete function as a reference point to cause the centroid position to coincide with the reference point.

11. The ranging method according to claim 10, wherein the correcting centroid includes interpolating between discrete data of the discrete function with a one-dimensional function, and treating interpolated values with the one-dimensional function as respective data values of each of the image modification filters, the interpolated values being at positions shifted from respective discretized points by the difference between the centroid position and the reference point.

12. The ranging method according to claim 10, wherein the correcting centroid includes treating values acquired by adding predetermined values expressed with a following equation to discrete data values of the discrete function as respective data values of each of the image modification filters:

$$\delta L = \frac{\sum_{i=1}^{n}(x_i L_i) - (g + \delta x)\sum_{i=1}^{n}(L_i)}{(g + \delta x)n - \sum_{i=1}^{n}(x_i)}$$

where,

δL: Predetermined value i: A number corresponding to discrete data included in discrete function n: The number of discrete data used for ranging xi: Coordinate of discrete data Li: Value of discrete data g: Centroid position of discrete function δx: Gap amount between centroid position g and reference point.

13. The ranging method according to claim 10, wherein, the first and second image modification filters are formed based on information on a distance up to the subject, the distance being measured by comparison of the first and second images.

14. The ranging method according to claim 10, wherein an image modification function used to form the first image modification filter is rendered to be a line spread function corresponding to the second image, and an image modification function used to form the second image modification filter is rendered to be a line spread function corresponding to the first image.

15. The ranging method according to claim 10, wherein an image modification function used to form the first image modification filter is rendered to be an inverse function of the line spread function corresponding to the first image, and an image modification function used to form the second image modification filter is rendered to be an inverse function of the line spread function corresponding to the second image.

16. The ranging method according to claim 10, further comprising estimating whether to perform the creating third and fourth images again based on information on the distance measured by comparison of the third and fourth images, wherein the first and second image modification filters are formed based on the information on the distance.

17. The ranging method according to claim 10, further comprising estimating the magnitude of an image gap amount between the first and second images, wherein, when the image gap amount is estimated to be small at the estimating magnitude, the distance up to the subject is calculated through the creating third and fourth images and the calculating distance.

* * * * *